Patented Feb. 5, 1935

1,989,981

UNITED STATES PATENT OFFICE 1,989,981

INSECTICIDE

Clyde C. Hamilton, Highland Park, N. J., assignor to Endowment Foundation, New Brunswick, N. J., a corporation of New Jersey No Drawing. Application April 13, 1933, Serial No. 665,956

3 Claims. (Cl. 167—14)

This invention relates to an insecticide especially useful or effective in the destruction of ants.

In the preparation of an insecticide for this purpose, it should be remembered that it must be of a nature such that it can be easily put around in places such as pantries, food closets, around the foundations of buildings, in lawns, golf courses, or in soil containing cultivated plants, or other places which are visited or infested by ants.

Insecticide powders are readily blown away by the breeze; consequently, my present invention is directed to a type of insecticide which is not open to this objection but is directed to one which is in the form of a jelly having ingredients which will cause it to remain in place over an extensive period of time without requiring containers which are necessary with liquid insecticides.

It is therefore the principal object of my invention to provide an insecticide which will fulfill all the requirements above set forth and at the same time be relatively inexpensive.

I have found that a compound or mixture using the following ingredients and in about the proportions specified, is highly effective for killing ants. The formula is approximately as follows:

Sugar, 5 pounds.
Honey, ½ pound.
Thallium sulphate, 2½ ounces.
Agar, 28 grams.
Water, 4 to 5 pounds to make 1 gallon with the above specified ingredients.

I have found that this mixture is best prepared by dissolving the thallium sulphate in a portion of the water by heating, and the agar in the remainder of the water by heating. The sugar and honey may be added to the water containing the agar after the agar is dissolved. Finally, the water containing the thallium sulphate is added to the solution containing agar, honey and sugar. This should be heated to thoroughly dissolve any sugar and bring about a uniform mixture.

The term agar, used in this specification and claims, is intended to cover the term agar agar which is the term sometimes used commercially in referring to this product. The function of agar in the above mixture is to form an ant bait with a jelly-like consistency which makes it unnecessary to use containers, and keeps the mixture from melting down or flowing under extreme temperatures which may be encountered in the summer time. The honey is used for giving off an attractive odor whereby the ants or other insects may be attracted to the bait.

This compound, I have found, to be most effective should be stirred, if in bulk, before it is placed in the traps or other places for the insects to reach, but a very handy way of carrying the compound is in collapsible tubes from which it may be squeezed out onto papers or other receptacles in a thin ribbon, whereby it is very readily gotten at by the ants. Also, the squeezing out of the jelly-like mixture from such a tube has the additional function of breaking up the structure, so that the odor derived from the honey emanates from the jelly.

I have found, by experiment, that thallium sulphate is not repellent to ants like arsenic, fluorine, and other poisonous substances, hence its use as above set forth produces a very effective ant-killing compound which is of such a nature that the ants can readily break off small pieces therefrom and take them away to their nest.

As a general proposition, it may be stated that liquids are preferable for ant baits over powders for the reasons previously stated, and further because the ants seem to prefer materials of a liquid character. My improved form of ant bait contains the properties of a liquid so far as attractiveness to ants is concerned, but at the same time it will not run like liquid and does not necessarily require containers, and it is not open to the objectionable features of powders.

Having thus described my invention, what I claim is:

1. An insecticide compound of jelly-like consistency for ants including sugar, honey, a thallium compound, agar not in excess of approximately 1%, and water substantially as herein described.

2. A mixture of jelly-like consistency especially useful for killing ants containing an ant poison, useful for killing ants, agar not in excess of approximately 1%, water, sugar and at least one substance for giving the mixture an attractive odor.

3. A mixture especially useful for killing ants containing one to two per cent. of a thallium compound in a mixture having a ratio of approximately five pounds of sugar, four to five pounds of water, twenty-eight grams of agar and one-half pound of honey, said mixture having a jelly-like consistency with a stiffness so the mixture will not readily flow under ordinary temperatures yet will allow the ants to readily break off particles of the mixture.

CLYDE C. HAMILTON.